United States Patent [19]

Greggain

[11] Patent Number: 5,365,277

[45] Date of Patent: Nov. 15, 1994

[54] APPARATUS WITH REDUCTION/MAGNIFICATION IMAGE SIZE PROCESSING FOR PRODUCING LOW-PASS FILTERED IMAGES

[75] Inventor: Lance Greggain, Woodbridge, Canada

[73] Assignee: Genesis Microchip Inc., Ontario, Canada

[21] Appl. No.: 133,372

[22] Filed: Oct. 8, 1993

[51] Int. Cl.$^5$ .............................................. H04N 5/14
[52] U.S. Cl. ..................................... 348/571; 348/438
[58] Field of Search .......... 358/180, 140, 183, 22 PIP, 358/38, 166; 382/47; 348/571, 575, 438, 240

[56] References Cited

U.S. PATENT DOCUMENTS

| | | | |
|---|---|---|---|
| 4,034,197 | 7/1977 | Lawrence et al. | 235/156 |
| 4,063,060 | 12/1977 | Litch, III | 219/93 |
| 4,163,249 | 7/1979 | Michael et al. | 358/180 X |
| 5,047,857 | 9/1991 | Duffield et al. | 358/180 X |
| 5,081,450 | 1/1992 | Lucas et al. | 382/47 |
| 5,138,452 | 8/1992 | Soloff | 358/180 X |
| 5,142,616 | 8/1992 | Kellas et al. | 358/183 X |
| 5,153,936 | 10/1992 | Morris et al. | 382/47 |
| 5,170,369 | 12/1992 | Rossum | 364/724.17 |
| 5,253,043 | 10/1993 | Gibson | 358/180 X |

Primary Examiner—Mark R. Powell
Assistant Examiner—John W. Miller
Attorney, Agent, or Firm—Staas & Halsey

[57] ABSTRACT

A circuit for filtering an input digital image comprising: first storage apparatus for storing the input digital image; apparatus for retrieving the input digital image from the first storage apparatus and generating a first resized digital image of reduced spatial frequency relative to the input digital image and being of smaller size than the input digital image; second storage apparatus for storing the first resized digital image; apparatus for retrieving the first resized digital image from the second storage apparatus and generating a second resized digital image of equal size to the input digital image, wherein the second resized digital image is a lowpass filtered version of the input digital image due to the reduced spatial frequency of the first resized digital image; and third storage apparatus for storing the second resized digital image.

3 Claims, 3 Drawing Sheets

APPARATUS WITH REDUCTION/MAGNIFICATION IMAGE SIZE PROCESSING FOR PRODUCING LOW-PASS FILTERED IMAGES

FIELD OF THE INVENTION

The present invention relates in general to digital signal processing of images and video signals, and more particularly to an image filtering system using image resizing apparatus for effecting image filtering of still images and video.

BACKGROUND OF THE INVENTION

Digital signal processing of digital images is well known in the art. Digital filters have been in existence for many years both in the literature (e.g. Rabiner L.R. and Schafer, "Digital Processing of Speech Signals", Prentice Hall, 1978) and various patents (e.g. U.S. Pat. Nos. 4,063,060; 4,034,197 and 5,170,369). Furthermore, many filter architectures have been developed to improve filter response and simplify filter development. The determination of filter co-efficients required to obtain a desired frequency response has been addressed in many text books and is a well known topic in university digital signal processing courses. The complexity of digital filters and the precision of the operations required to perform image filtering vary widely depending upon the filter operation that is selected.

Recent advances have been made in the digital signal processing of images to effect image resizing. One example of such an innovation is disclosed in U.S. patent application No. 07/766,128. In particular, an integrated circuit implementation of the image resizing engine disclosed in U.S. patent application No. 07/766,128, has recently been fabricated. These resizing circuits eliminate aliasing distortion in reduction mode and imaging distortion in magnification mode.

SUMMARY OF THE INVENTION

According to the present invention, apparatus and method are provided for utilizing recently developed image resizing technology in order to perform special effect image filtering. The method and apparatus of the present invention takes advantage of the inherent accurate filtering utilized by such resizing apparatus in preventing aliasing and imaging distortion to perform image filtering. By combining various resize factors and arithmetic functions, the method and apparatus of the present invention provides image filtering and image enhancement capabilities in integrated circuit form.

BRIEF DESCRIPTION OF THE DRAWINGS

A detailed description of the preferred embodiment is provided hereinbelow with reference to the following drawings, in which.

Figure 1:
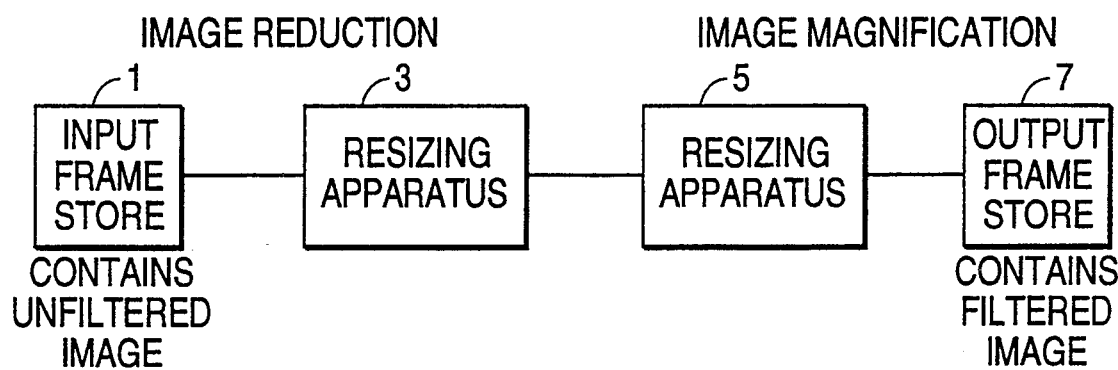
FIG. 1 is a block diagram of a low pass filter using two image resizing apparatuses according to a broad aspect of the present invention.

Turning firstly to FIG. 1, a low pass filter is shown comprising an image frame store 1 for receiving and storing an unfiltered input digital image, and a first resizing apparatus 3 for receiving and resizing the input digital signal to a smaller size. The resizing apparatus 3 is preferably of the form and structure of image resizing system disclosed in applicant's co-pending application number 08/125,530, filed Sep. 22, 1993 and entitled DIGITAL IMAGE RESIZING APPARATUS, the contents of which are incorporated herein by reference.

In the process of reducing the number of pixels and lines, the resizing apparatus 3 also removes spatial frequency from the input digital signal. The reduced size image from resizing apparatus 3 is then restored to the original size of the input digital signal by resizing apparatus 5 and then transmitted to output frame store 7.

The restored image in output frame store 7 is the same size and contains the same representation as the input digital image except that the high frequency information is removed during the resizing process, as discussed above in connection with resizing apparatus 3. Hence, by reducing the input image in resizing apparatus 3 and subsequently magnifying the reduced image to the original size in resizing apparatus 5, a low pass filtered version of the input digital signal is generated. Thus, the configuration of elements illustrated in FIG. 1 effectively implements a low pass filter for still or video images.

Figure 2:
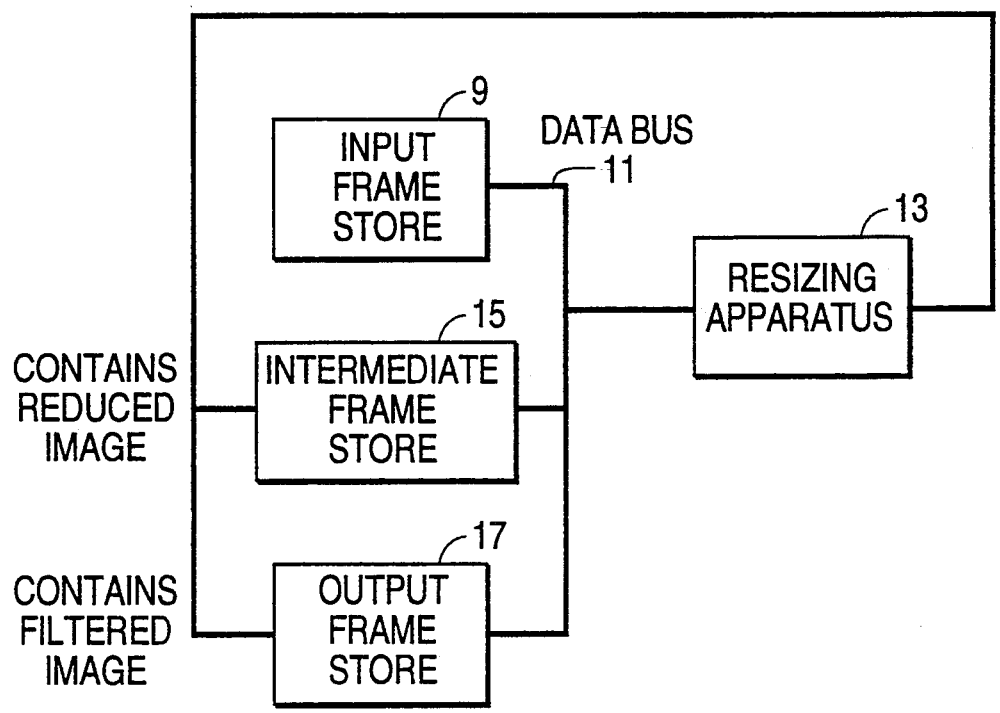
FIG. 2 is block diagram of a low pass filter using a single image resizing apparatus according to an alternative embodiment of the invention.

Turning to the alternative embodiment of FIG. 2, an input digital image is received in an input frame store 9 as discussed above in connection with the embodiment of FIG. 1. Input frame store 9 is connected via a data bus 11 to resizing apparatus 13. An output of resizing apparatus 13 is connected to the inputs of an intermediate frame store 15 as well as an output frame store 17. In operation, resizing apparatus 13 first reduces the size of the input digital image and stores the reduced image in intermediate frame store 15. Next, the same resizing apparatus 13 magnifies the reduced image stored in intermediate frame store 15 and stores the magnified image in output frame store 17. Where the degrees of reduction and magnification provided by resizing apparatus 13 are the same (e.g. reduction by $\frac{1}{2}$ and magnification by two), then the final image stored in output frame store 17 comprises a low pass filtered version of the input image.

The embodiment of FIG. 1 enjoys the advantage of a greater pixel processing speed than the embodiment of FIG. 2. However, the embodiment of FIG. 2 enjoys the advantage of reduced hardware over the embodiment of FIG. 1. One alternative to the embodiment of FIG. 2, would be to eliminate the output frame store 17 and utilize frame store 9 as both an input and output frame store. In this embodiment, the input frame store 9 would have a secondary input connected to resizing apparatus 13 and the input digital image stored within frame store 9 would be re-written by the low pass filtered version of the image output from resizing apparatus 13.

According to the principles of the present invention, a high pass filter can be implemented by simply subtracting the low pass filtered version of the original image from the original image contained in the input frame store. Likewise, a band pass filter can be effected by subtracting a low pass filtered version of the original image from a higher frequency low pass filtered version of the same image. Also, high frequency emphasis can be accomplished using the principles of the present invention by adding to the original image a predetermined high frequency portion of the image multiplied by a scalar quantity. Thus, any portion of the image spectrum can be emphasized or de-emphasized by selecting a predetermined frequency band of interest and by adding or subtracting a scalar multiple of the selected frequency band.

Figure 3:
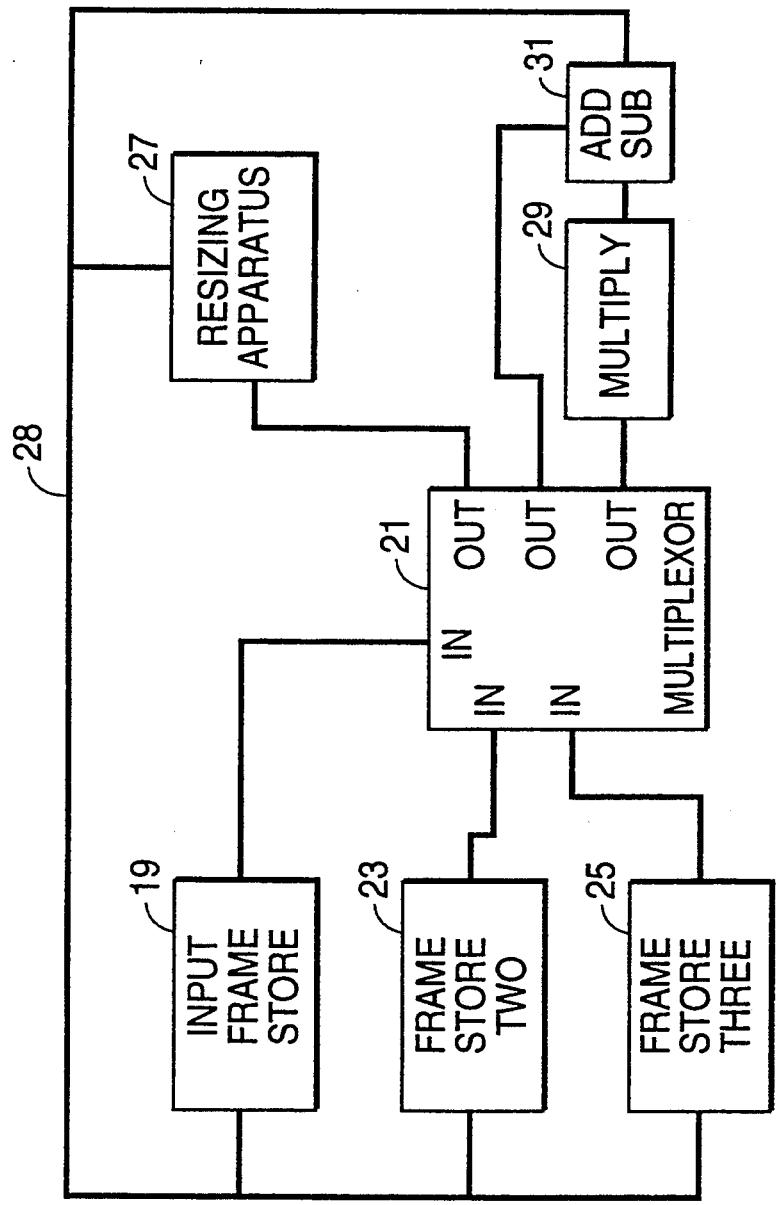
FIG. 3 is an image filtering circuit for complex image filtering according to a third embodiment of the invention.

FIG. 3 shows a block diagram of an embodiment of the invention for adjusting spatial frequency content of an image.

Input frame store 19 has an output connected to a first input of a multiplexer 21. A first output of multiplexer 21 is connected to the input of a resizing apparatus 27. An output of resizing apparatus 27 is connected to respective inputs of the input frame store 19, as well as to the inputs of a second frame store 23 and third frame store 25. The outputs of frame stores 23 and 25 are connected to second and third inputs, respectively, of multiplexer 21. A second output of multiplexer 21 is connected to the input of a multiplier 29, and a third output of multiplexer 21 is connected to a first input of an adder/subtractor 31. An output of multiplier 29 is connected to a second input of adder/subtractor 31, and an output of the adder/subtractor 31 is connected to the data bus 28 which interconnects the output of resizing apparatus 27 to the inputs of the frame stores 19, 23 and 25.

The image filtering circuit of FIG. 3 performs low pass filtering of an input image in an identical manner as discussed above in connection with FIG. 2. However, the inclusion of multiplier 29 and adder/subtractor 31 in the circuit implementation of FIG. 3, facilitates additional special effects digital processing. For example, a high pass filtered version of an input digital image stored in frame store 19, may be obtained by routing the input digital image from frame store 19 to resizing apparatus 27 via multiplexer 21, reducing the input digital image and storing the reduced image in the second frame store 23. The reduced image from frame store 23 is then routed to resizing apparatus 27 via multiplexer 21 for magnification of the image back to its original size. The magnified image output from resizing apparatus 27 is then stored in the third frame store 25. Next, the original input digital image from input frame store 19 may be routed to the third output of multiplexer 21 for application to the first input of adder/subtractor 31, while the low pass filtered version of the input image stored in frame store 25 is routed to the second output of multiplexer 21 for application to multiplier 29. Multiplier 29 is capable of either transmitting the low pass filtered version of the signal directly to the second input of adder/subtractor 31 without alteration (i.e. multiplication by 1), or the low pass filtered version of the image from frame store 25 may be multiplied by a predetermined scalar value within multiplier 29 and then applied to the second input of. adder/substractor 31. In the event that the low pass filtered version of the image from frame store 25 is simply transmitted through multiplier 29 with unity gain, then adder/substractor 31 subtracts the low pass filtered version of the image applied to the second input thereof from the original image applied to the first input thereof, and in response generates a high pass filtered version of the image on its output. The high pass filtered version is then transmitted by data bus 28 for storage in frame store 25.

However, high frequency emphasis may be obtained by multiplying the high pass filtered version of the signal now stored in frame store 25 by a predetermined scalar value within multiplier 29 and adding the scalar multiplied image to the original image stored in the input frame store 19. Likewise, the scalar multiplied image may be subtracted from the original image stored in frame store 19 for de-emphasizing high frequency components of the original image. In either case, the high frequency emphasized or high frequency de-emphasized images are then stored in frame store 23.

The circuit of FIG. 3 may also be utilized for effecting a band pass filtered version of the input digital image. Specifically, resizing apparatus 27 may be utilized to reduce the original input digital image by a first resize factor and store the reduced image in frame store 23. The contents of frame store 23 are then magnified to restore the image to its original size. The magnified image is then stored in the frame store 25. The original image in frame store 19 is then reduced by a further re-size factor and the reduced image is stored in frame store 23. The reduced image in frame store 23 is then magnified to the original image size and stored in input frame store 19. The image in input frame store 19 corresponds to one low pass filtered version of the original image while the image stored in frame store 25 corresponds to a further low pass filtered version of the original signal. The two low pass filtered images stored in frame stores 19 and 25 may then be routed via multiplexer 21 for subtraction in adder/subtractor 31, resulting in a band pass filtered version of the original image which is then stored in frame store 23.

Figure 4:
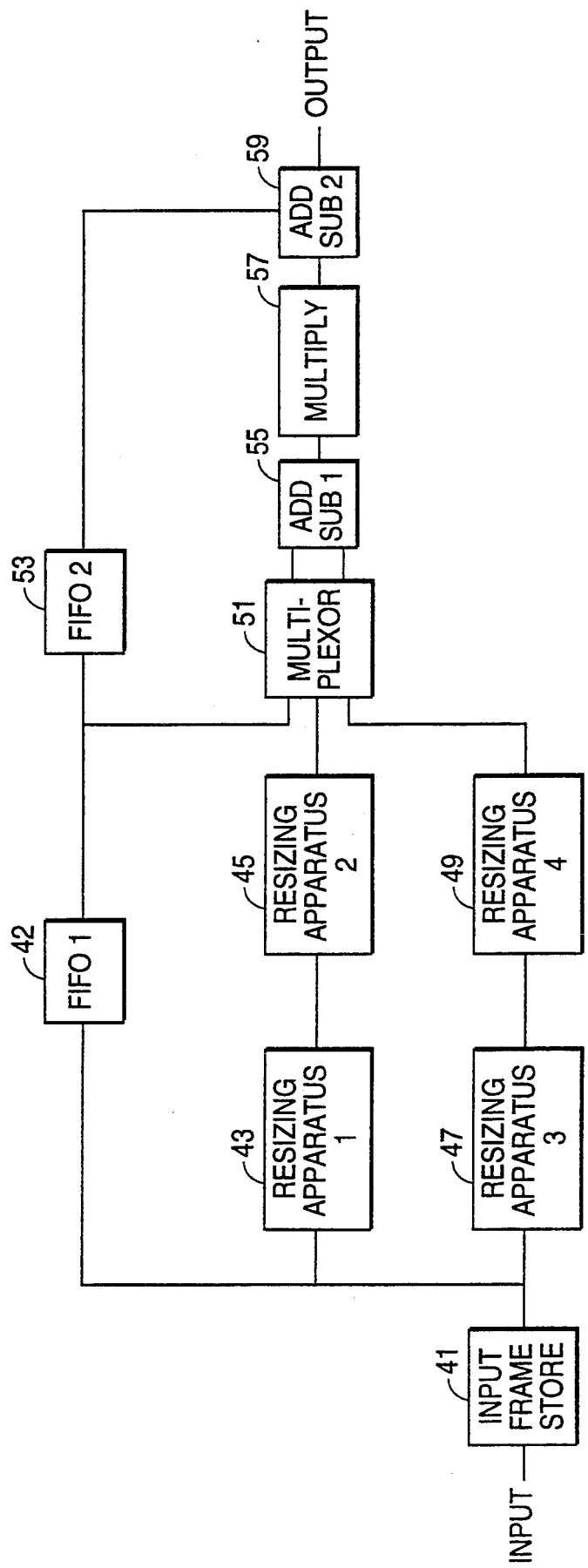
FIG. 4 is a block diagram of a video filtering system according to the preferred embodiment.

The embodiments of FIGS. 2 and 3 provide a minimum of hardware, and are most suitable for the digital processing of still images. However, in order to provide high speed pixel processing of video images, the embodiment of FIG. 4 is preferred. An input frame store 41 receives and stores an input digital image in the usual manner. An output of frame store 41 is connected to a FIFO memory 42. The output of frame store 41 is also connected to a first pair of series connected resizing apparatus 43 and 45, and to a second pair of series connected resizing apparatus 47 and 49. The outputs of FIFO memory 42, resizing apparatus 45 and resizing apparatus 49 are connected to three respective inputs of a multiplexer 51. The output of FIFO memory 42 is also connected to the input of a further FIFO memory 53. First and second outputs of multiplexer 51 are connected to respective inputs of a first adder/subtractor 55. An output of adder/subtractor 55 is connected to an input of multiplier 57. An output of FIFO memory 53 is connected to the first input of a further adder/subtractor 59 while the second input of adder/subtractor 59 is connected to the output of multiplier 57. An output of adder/subtractor 59 may be connected to an output frame store, or other suitable output means.

The video filtering system of FIG. 4 operates essentially in the same manner as the system discussed above with reference to FIG. 3 except that instead of sharing a single resizing apparatus amongst various frame stores, respective series connected pairs of resizing apparatus are provided for high speed reduction and magnification of the image to provide low pass filtered versions of the original image on the outputs of resizing apparatus 45 and 49. The multiplexer 51 selects from two of the three inputs provided by FIFO memory 42, resizing apparatus 45 and resizing apparatus 49. Scalar multiplication, addition and subtraction are performed in the usual manner via adder/subtractor 55 and 59, and multiplier 57.

For example, consider an original input digital image containing 1000 pixels by 1000 lines. The circuit of FIG.

4 may be used to emphasize the middle frequencies of the original image as follows: resizing apparatus 43 reduces the original input image to, say, 250 pixels by 250 lines and resizing apparatus 45 then restores the reduced image to the original 1000 pixels by 1000 lines. Likewise, resizing apparatus 47 reduces the input image to, say, 500 pixels by 500 lines while resizing apparatus 49 restores the reduced image output from resizing apparatus 47 to the original 1000 pixels by 1000 lines. Multiplexer 51 then selects the outputs of resizing apparatus 45 and 49 for input to adder/subtractor 55. Adder/subtractor 55 takes the difference between the two low pass filtered versions of the input image, thereby isolating the middle octave of input image frequency. The multiplier 57 then multiplies the isolated middle octave by a factor of 2. Adder/subtractor 59 then adds the emphasized version of the middle octave output from multiplier 57 to the original image output from FIFO 53, resulting in an output image from adder/subtractor 59 which is equivalent to the original input image but which is enhanced by having a middle octave with 3 times the amplitude of the middle octave contained in the original image.

Other embodiments and modifications of the invention are possible. For instance, although it is preferred that the resizing apparatus be configured in accordance with the teachings of applicant's copending application number 08/125,530, filed Sep. 22, 1993, and entitled DIGITAL IMAGE RESIZING APPARATUS, as discussed above, it is contemplated that the filtering system of the present invention may also be implemented using any appropriate resizing apparatus. All such embodiments and modifications are believed to be within the sphere and scope of the invention as defined by the claims appended hereto.

I claim:
1. A video filtering system, comprising:
   a) input storage means for storing an input digital image;
   b) first temporary storage means connected to said input storage means for temporarily storing said input digital image;
   c) a first pair of series connected resizing apparatus connected to said input storage means for reducing said input digital image to a first reduced size and then magnifying said first reduced size digital input image to original size as a first low-pass filtered version of said input digital image;
   c) a second pair of series connected resizing apparatus connected to said input storage means for reducing said input digital image to a second reduced size and then magnifying said second reduced size digital input image to original size as a second low-pass filtered version of said input digital image;
   d) a multiplexer having a first input connected to said first temporary storage means, a second input connected to said first pair of series connected resizing apparatus, and a third input connected to said second pair of series connected resizing apparatus, for selecting said input digital image stored in said first temporary storage means for output on a first output thereof, and one of said first or second low-pass filtered versions of said input digital image on a second output thereof;
   e) a first adder/subtracter connected to said first output and said second output of said multiplexer for adding or subtracting said selected one of said first or second low-pass filtered versions of said input digital image to or from said input digital image temporarily stored in said first temporary storage means and in response generating a first intermediate image;
   f) a multiplier connected to said first adder/subtracter for multiplying said first intermediate image by a predetermined scaling factor and in response generating a second intermediate image;
   g) a second temporary storage means connected to said first temporary storage means for further temporarily storing said input digital image;
   h) a second adder/subtracter connected to said multiplier for adding or subtracting said second intermediate image to or from said input digital image temporarily stored in said second temporary storage means and in response generating an output filtered image.

2. The video filtering system of claim 1, wherein said input storage means comprises a frame store.

3. The video filtering system of claim 1 wherein said first and second temporary storage means are each comprised of a FIFO.

* * * * *